United States Patent
Sutoh

(10) Patent No.: US 7,398,420 B2
(45) Date of Patent: Jul. 8, 2008

(54) METHOD FOR KEEPING SNAPSHOT IMAGE IN A STORAGE SYSTEM

(75) Inventor: Atsushi Sutoh, Kokubunji (JP)

(73) Assignee: Hitachi, Ltd., Tokyo (JP)

(*) Notice: Subject to any disclaimer, the term of this patent is extended or adjusted under 35 U.S.C. 154(b) by 339 days.

(21) Appl. No.: 11/012,095

(22) Filed: Dec. 16, 2004

(65) Prior Publication Data

US 2006/0085663 A1    Apr. 20, 2006

(30) Foreign Application Priority Data

Oct. 18, 2004    (JP) .............................. 2004-302430

(51) Int. Cl.
*G06F 12/16*    (2006.01)
(52) U.S. Cl. .................. 714/15; 714/6; 714/5; 711/162
(58) Field of Classification Search ........................ None
See application file for complete search history.

(56) References Cited

U.S. PATENT DOCUMENTS 5,835,953 A * 11/1998 Ohran ........................ 711/162
6,473,775 B1 * 10/2002 Kusters et al. ............... 707/200
6,618,794 B1 * 9/2003 Sicola et al. ................. 711/154
2003/0140070 A1 * 7/2003 Kaczmarski et al. ........ 707/204

FOREIGN PATENT DOCUMENTS

JP    2004-118413    4/2004

* cited by examiner

*Primary Examiner*—B. James Peikari
(74) *Attorney, Agent, or Firm*—Antonelli, Terry, Stout & Kraus, LLP.

(57) ABSTRACT

A technique for realizing a snapshot function is provided, which can reduce data transfer between a server system and a storage subsystem which is necessary during data copy operations between storage devices and reduce the degradation of data access performance of the storage device in operation. In a storage system, a command processed by a CPU of a storage subsystem includes a COPY and WRITE command for performing a data copy process and a data storage process in accordance with a predetermined sequence, and a server system issues the command to the storage subsystem. After receiving the command, the storage subsystem executes a data copy process from a first disk drive to a second disk drive, and subsequently executes a data storage process to the first disk drive, thereby keeping a snapshot of the data stored in the first disk drive.

15 Claims, 15 Drawing Sheets

FIG.3

| BLOCK ADDRESS | COPY SAVING ADDRESS |
|---|---|
| 0 | 100 |
| 1 | NULL |
| 2 | 135 |
| ⋮ | ⋮ |
| m-1 | NULL |

FIG.4

| BLOCK ADDRESS | STATUS FLAG |
|---|---|
| 0 | USED |
| ⋮ | ⋮ |
| p | UNUSED |
| ⋮ | ⋮ |
| n-1 | UNUSED |

| LOGICAL BLOCK ADDRESS | PHISYCAL DISK NUMBER | PHISYCAL BLOCK ADDRESS |
|---|---|---|
| 0 | 0 | 0 |
| 1 | 0 | 1 |
| ⋮ | ⋮ | ⋮ |
| q | 1 | 100 |
| ⋮ | ⋮ | ⋮ |
| m−1 | 0 | m−1 |

METHOD FOR KEEPING SNAPSHOT IMAGE IN A STORAGE SYSTEM

CROSS-REFERENCE TO RELATED APPLICATION

The present application claims priority from Japanese Patent Application JP 2004-302430 filed on Oct. 18, 2004, the content of which is hereby incorporated by reference into this application.

TECHNICAL FIELD OF THE INVENTION

The present invention relates to a storage subsystem and a technique for realizing a snapshot function in a storage system including the storage subsystem. More particularly, it relates to a technique which is effective when applied to a method for creating and keeping a snapshot.

BACKGROUND OF THE INVENTION

According to studies performed by the inventor of the present invention, the following techniques are examples of known techniques for realizing a snapshot function in a conventional storage system.

For example, as the use of information systems has been expanding, the capacity of storage devices for storing the data thereof has also been increasing. Also, the value of the data stored in the storage devices has increased, and the destruction of data due to unauthorized accesses to data or erroneous operations in the storage devices has resulted in a great loss in the management of information systems. Therefore, data protection functions become more and more important for the purpose of the prevention of data destruction and recovery when data is destroyed.

A snapshot function is often used as a data protection function of storage devices. By using a snapshot function, a snapshot which is a still image of the data in an operating storage at a certain point can be created and kept. The snapshot can be accessed by means different from that of the storage in operation, and the data at the point of the creation thereof can be referenced. Therefore, when the data in the storage devices in operation is destroyed, the data at the point of snapshot creation can be recovered.

The methods for realizing the snapshot function can generally be classified into two methods, i.e., a method utilizing the functions of a server system for processing and controlling the data, and a method utilizing the functions of a storage subsystem for storing data.

In the method utilizing the functions of a server system, the software which operates in the server system is utilized. For example, there is a method of creating a snapshot by the use of a function of an OS (e.g., "LVM HOWTO" by A J Lewis, which can be accessed at ibiblio.org/pub/Linux/docs/HOWTO/other-formats/pdf/LVM-HOWTO.pdf). A storage volume in operation (operation volume) and another storage volume for creating a snapshot (differential volume) are prepared. When the OS is instructed to create a snapshot of the operation volume, it becomes possible to reference a snapshot which is an image of the operation volume at that point. When the operation volume is updated after the snapshot has been created, the data in the operation volume before the update is copied to the differential volume. Then, when the data address of the snapshot is referenced, the data is returned if the data has been copied to the differential volume, or the data in the operation volume is returned if the copy has not been performed. As described above, a snapshot image is kept by storing the data at the time of snapshot creation in the differential volume.

Further, another prior art approach is a method of utilizing the functions of a storage subsystem (e.g., Japanese Patent Application Publication No. 2004-118413). Also in this case, a storage volume in operation and another storage volume for snapshot creation are prepared. Then, from the server system connected to the storages or a control console of the storage volumes, an instruction for creating a snapshot of the storage volume in operation is given to the storage subsystem. When the storage volume in operation is updated after the snapshot creation, the storage subsystem copies the data in the storage volume in operation before the update to the storage volume for snapshot creation. When the address of the data having the snapshot in the storage subsystem is referenced, the data is returned if the data has been copied to the storage volume for snapshot creation, or the data is returned from the storage volume in operation if the copy has not been performed. As described above, an image of the storage volume in operation at the point of snapshot creation is kept by storing the data at the point of snapshot creation in the storage volume for snapshot creation in the storage subsystem.

SUMMARY OF THE INVENTION

Meanwhile, as a result of the studies by the inventor of the present invention for the techniques for realizing the snapshot function in the above-described conventional storage system, the following findings have been made.

For example, when a snapshot is to be created by utilizing the software which operates in a server system, data is read from the storage volumes in operation to the server system and written to the storage volume for snapshot creation when copying data. Therefore, in comparison with a case where a snapshot is not created, more data transfer between the server system and the storage subsystem is required for issuing commands and read and write of the storage data, and therefore, such a problem occurs that the data access performance to the storage volume in operation is degraded.

Meanwhile, when a snapshot is to be created by utilizing functions of the storage subsystem, regardless of the status of use and the access property of the storage volume in operation, the data before the update is copied as a differential in the storage subsystem. Therefore, the storage volume for snapshot creation is sometimes consumed more than necessary. For example, the data present at an address in the storage volume in operation is copied to the storage volume for snapshot creation even though the data at the address is not used when viewed from the server system. When the snapshot is referenced in this case, even if the server system accesses the data at the address which has not been used, the data makes no sense.

Further, when a snapshot is created by utilizing functions of the storage subsystem, regardless of the data access property from the server system, the data before the update is copied in the storage subsystem. Therefore, the data copy is performed in units of data management of a disk drive. Consequently, although a data copy operation can be performed all at once by executing one copy command in the storage subsystem when the data access property from the server system is a sequential access, a number of commands for each unit of data management have to be processed. More specifically, such a problem occurs that a flexible data copy operation suitable for the data access property from the server system cannot be executed.

In view of the foregoing, an object of the present invention is to provide a technique for realizing a snapshot function which can reduce data transfer between the server system and the storage subsystem, which is necessary in data copy operations for storage devices, and reduce the degradation of data access performance of the storage volumes in operation.

Another object of the present invention is to provide a technique for realizing a snapshot function which can reduce unnecessary consumption of the storage volumes for snapshot creation and execute a snapshot keeping process suitable for the data access property.

The above and other objects and novel characteristics of the present invention will become apparent from the description and attached drawings of this specification.

An outline of the representative ones of the inventions disclosed in this application will be described as follows.

(1) The present invention is applied to a storage subsystem including a plurality of storage devices, a connection device for connecting with an external device, and a control unit. Moreover, the present invention is applied to a storage system comprising the storage subsystem and a server system connected to the storage subsystem. Moreover, the present invention is applied to a method for keeping a snapshot in the storage system.

The control unit of the storage subsystem has a function to process a command for accessing the data which has been received via the connection device and stored in the plurality of storage devices. The command processed by the control unit of the storage subsystem includes a first command for performing a data copy process from a first storage device to a second storage device and a data storage process to the first storage device in accordance with a predetermined sequence.

The server system has a function to issue the first command to the storage subsystem. The control unit of the storage subsystem has a function to execute, after receiving the first command, a data copy process from the first storage device to the second storage device, and subsequently, execute a data storage process to the first storage device. Then, a snapshot of the data stored in the first storage device is kept by the use of the data stored in the first storage device and the data stored in the second storage device.

The first command includes, as information, an identifier representing the type of control of the data copy process and the data storage process, an identifier representing the first storage device which is the data copy source, a data location of the data copy source in the first storage device, an identifier representing the second storage device which is the data copy destination, a data location of the data copy destination in the second storage device, the data copy capacity, the first storage device which is the data storage destination, a data location of the data storage destination in the first storage device, the size for storing data, and an identifier of the data to be stored. Further, the command may comprise a plurality of sets of the above-described information.

(2) The present invention is applied to a storage subsystem including a plurality of storage devices, a connection device for connecting with an external device, and a control unit. Moreover, the present invention is applied to a storage system comprising the storage subsystem and a server system connected to the storage subsystem. Furthermore, the present invention is applied to a method for keeping a snapshot in the storage system.

The control unit of the storage subsystem has a function to process a command for accessing the data which has been received via the connection device and stored in the plurality of storage devices. The command processed by the control unit of the storage subsystem includes a second command for performing a process of swapping the arrangement of the data in a first storage device and the data in a second storage device.

The server system has a function to issue the second command to the storage subsystem. The control unit of the storage subsystem has a function to execute, after receiving the second command, a process of swapping the arrangement of the data in the first storage device and the data in the second storage device. The process of swapping the arrangement of the data in the first storage device and the data in the second storage device is realized by exchanging the logical arrangement of the data. Then, a snapshot of the data stored in the first storage device is kept by the use of the data stored in the first storage device and the data stored in the second storage device.

The second command includes, as information, an identifier representing the type of control of the swapping process, an identifier representing the first storage device for data swapping, a data location in the first storage device for data swapping, an identifier representing the second storage device for data swapping, a data location in the second storage device for data swapping, and the data swapping capacity. Further, the command may comprise a plurality of sets of the above-described information.

The effects obtained by typical examples of the invention disclosed in this application will be briefly described below.

According to the present invention, data transfer between a server system and a storage subsystem, which is necessary during data copy operations between storage devices, can be reduced and the degradation of the data access performance of the storage volume in operation can be reduced.

In addition, according to the present invention, since a server system can give an instruction for a data copy operation suitable for the status of use of the storage device in operation, unnecessary consumption of the storage device for snapshot creation can be reduced.

In addition, according to the present invention, since the server system can instruct the execution of a data copy operation, a snapshot keeping process suitable for the data access property can be performed.

BRIEF DESCRIPTIONS OF THE DRAWINGS

FIG. 3 is an explanatory diagram showing an example of a block copy management table in the first embodiment of the present invention;

FIG. 4 is an explanatory diagram showing an example of a block management table used in the first embodiment of the present invention;

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

According to the present invention, reduced degradation of the data access performance of the operation volume due to the process of storing the differential data, which is necessary for keeping a snapshot, can be achieved by executing an instruction given from the server system in the storage subsystem. The present invention is characterized in that the server system keeps a snapshot by the use of a command interface for instructing the storage subsystem to perform the data copy and data update at the same time. Also, the present invention is characterized in that the software which operates in the server system uses the command interface and that the storage subsystem executes the processes instructed by the command interface.

In the present invention, there are two methods for giving an instruction from the server system to the storage subsystem. The first is a method in which a data copy process from a first storage device to a second storage device and a data storage process to the first storage device are performed, more specifically, a method in which differential data copy operation and data update operation performed respectively by a data copy operation from the operation volume to the differential volume and data storage to the operation volume are issued at the same time (first embodiment). The second is a method in which a process of swapping the arrangement of the data in the first storage device and the data in the second storage device is performed, more specifically, the data in the operation volume and the differential volume is swapped (second embodiment). These two methods will be described in detail below.

First Embodiment

This embodiment shows an example for keeping a snapshot by issuing a command for instructing copy and write of data at the same time from a server system to a storage subsystem (referred to as a COPY and WRITE command here), and executing the command by the storage subsystem.

Figure 1:
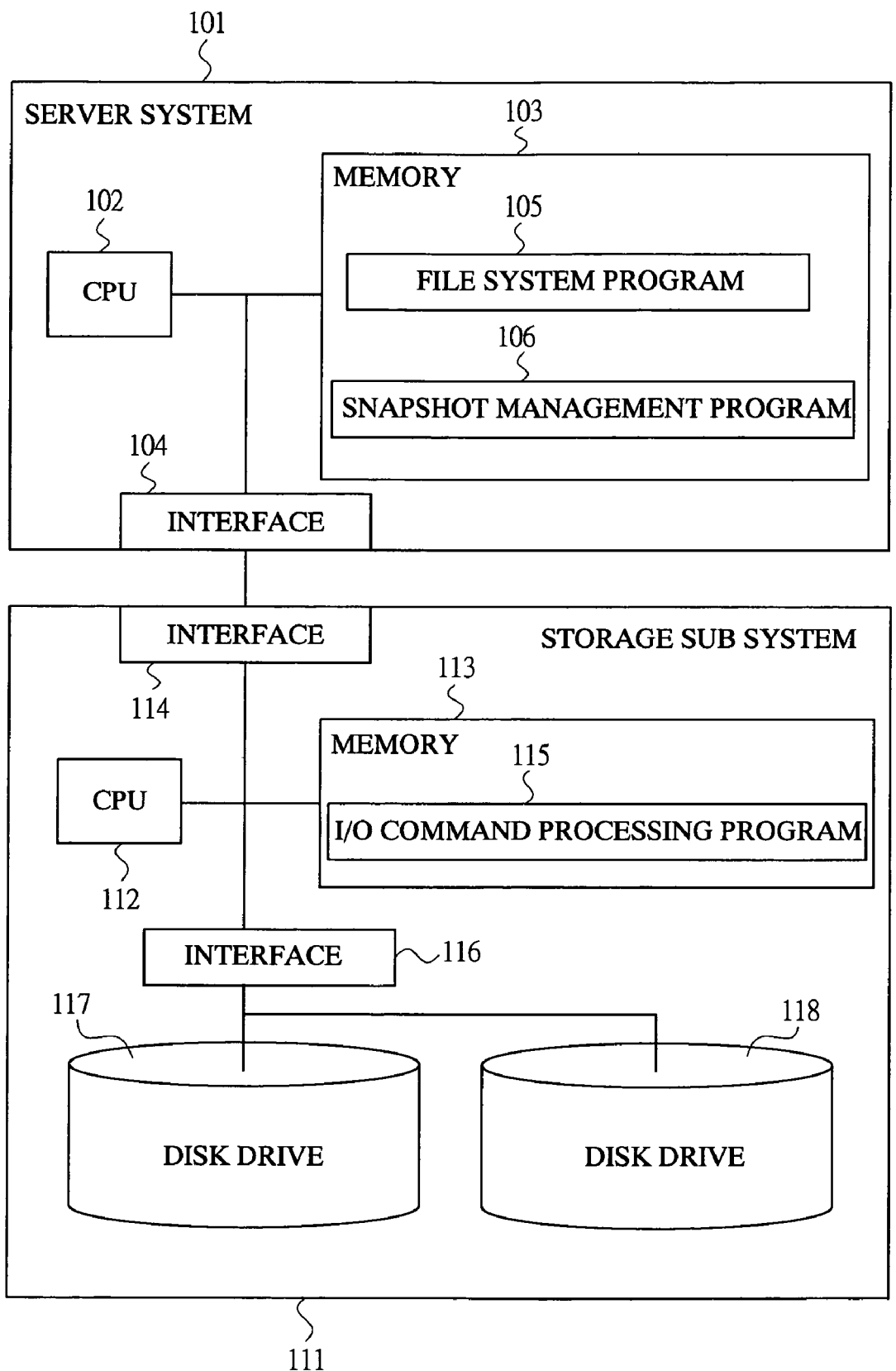
FIG. 1 is a block diagram showing a system configuration example of a storage system in a first embodiment of the present invention.

FIG. 1 is a block diagram showing a system configuration example of a storage system of a first embodiment according to the present invention.

The storage system of this embodiment comprises a server system 101 and a storage subsystem 111.

The server system 101 is provided with a CPU 102 having a function as a control unit for performing processes, a memory 103 for retaining the data which is required for processes performed in the server system 101 and software which is executed by the CPU 102, and an interface 104 having a function as a connection device for connecting the server system 101 and the storage subsystem 111 so as to perform data transfer between them.

A file system program 105 and a snapshot management program 106 are provided in the memory 103 as the software which operates in the server system 101. The file system program 105 is used for data management which is used in the service provided by the server system 101. For example, when a file server program is executed in the server system 101, the file system program 105 manages the file thereof. Alternatively, the file system program 105 is used when a database is under execution, or when the data handled by a database management system program is handled as a file. When accessing an operation volume or a snapshot, the file system program 105 issues a read or write request to the snapshot management program 106, thereby performing data transfer with disk drives. The snapshot management program 106 creates and keeps a snapshot by the use of a combination of the operation volume and a differential volume so as to enable the access to the volumes.

The storage subsystem 111 is provided with disk drives 117 and 118 which function as storage devices for retaining data, a CPU 112 having a function as a control unit for performing processes in the storage subsystem 111, a memory 113 for retaining the data which is required for processes performed in the storage subsystem 111 and the software which is executed by the CPU 112, an interface 114 having a function as a connection device for connecting the storage subsystem 111 and the server system 101 so as to perform data transfer between them, and an interface 116 having a function as a connection device for performing data transfer between the disk drive 117 and the disk drive 118 involved in the processes executed by the CPU 112.

In each of the disk drives 117 and 118, access can be performed in units of blocks, wherein a block is a unit for managing data of a predetermined size. Therefore, in data read or data write operations, and during access to other data, the data has to be specified in units of blocks.

An I/O command processing program 115 is provided in the memory 113 as the software which operates in the storage subsystem 111. The I/O command processing program 115 executes I/O commands requested by the server system 101 via the interface 114. For example, when the interface 114 is a SCSI interface, a SCSI command is received as an I/O command, the storage subsystem 111 executes the I/O command processing program 115 by the CPU 112, thereby processing the I/O command which is a request from the server system 101.

Each of the disk drive 117 and the disk drive 118, which are mediums for storing data, is a single disk drive device or an area called a partition obtained by dividing a disk drive device into a plurality of areas. Alternatively, a RAID system (Redundant Arrays of Inexpensive Disks), in which a plurality of disk drive devices are integrally managed, may be employed. Also, a plurality of disk drive devices may be logically employed as the disk drives.

The server system 101 uses the disk drive 117, which is in the storage subsystem 111, as a volume (operation volume) used for services provided by the server system 101 by creating a file system. In addition, the disk drive 118 is used as a volume for storing differential data (differential volume) between a snapshot and the operation volume in order to keep the snapshot. Also, a snapshot is not a physical disk drive used as a volume but is a virtual volume formed by combining data stored in the operation volume and the differential volume by means of the snapshot management program 106 of the server system 101. Hereinafter, a snapshot is described as a read-only volume, that is, write to the snapshot cannot be performed. However, it is also possible to perform the write to the snapshot if the snapshot management program 106 is modified.

Next, the snapshot management program 106 which operates in the server system 101 will be described with reference to FIG. 2, FIG. 3, and FIG. 4.

Figure 2:
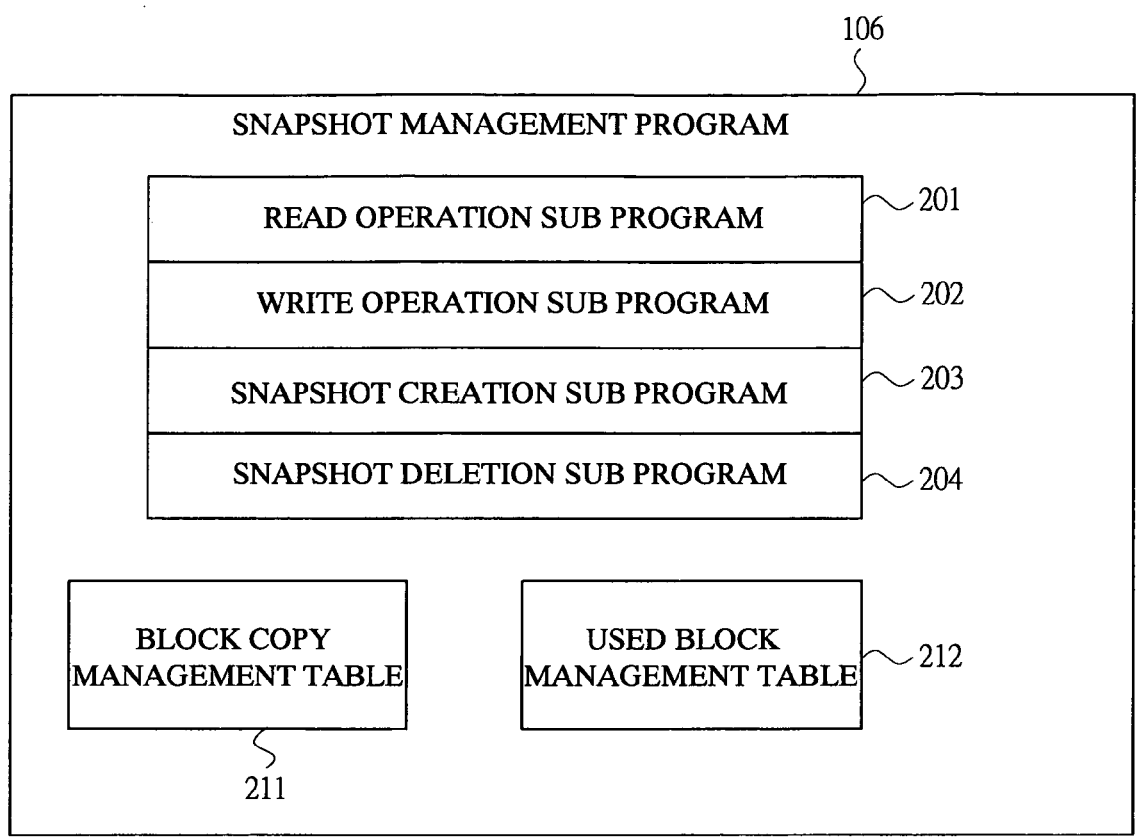
FIG. 2 is an explanatory diagram showing a configuration example of a snapshot management program in the first embodiment of the present invention.

FIG. 2 is an explanatory diagram showing a configuration example of the snapshot management program 106. The snapshot management program 106 is the software which operates in the server system 101 to control access to the snapshot and the operation volume. Software modules and data constituting the snapshot management program 106 will be described with reference to FIG. 2. The snapshot management program 106 comprises a read operation sub program 201 and a write operation sub program 202 for controlling access to the data of the operation volume or the snapshot, a snapshot creation sub program 203 and a snapshot deletion sub program 204 for performing processes employing the snapshot, and a block copy management table 211 and a used block management table 212 which are necessary for keeping the snapshot.

The read operation sub program 201 executes a data read operation from the operation volume and the snapshot. When the data read operation from the snapshot is to be performed, data has to be read from either the operation volume or the differential volume to constitute a volume image at the time of snapshot creation. Therefore, a table for storing data arrangement is required. The configuration of the table will be described later by the use of FIG. 3 and FIG. 4.

The write operation sub program 202 executes a data write operation to the operation volume. When the write operation to the operation volume is executed, a snapshot is created. Therefore, a process of saving data stored in the operation volume to the differential volume has to be taken into consideration. Also, in this embodiment, a snapshot is considered as data to be protected, and write thereto is not performed. When a write operation to the snapshot is to be permitted, the write operation sub program 202 has to be modified so that data can be written to a block in the differential volume.

The snapshot creation sub program 203 is a program executed in creation of a snapshot and performs a process of initializing the contents of tables which are necessary for constituting and keeping a snapshot.

The snapshot deletion sub program 204 is a program executed in deletion of a snapshot. After the snapshot creation sub program 203 is executed, the snapshot deletion sub program 204 performs a process of discarding the contents of the tables which have been used for constituting and keeping the snapshot.

The block copy management table 211 is a table for saving the information for constituting a snapshot, which is a virtual volume, from the data in the operation volume and the differential volume. The used block management table 212 is a table for managing blocks used in the differential volume for keeping a snapshot.

FIG. 3 is an explanatory diagram showing an example of the block copy management table 211. In this embodiment, the operation volume consists of m blocks, and the table has m rows from a row 321 having a block address of 0 to a row 324 having a block address of m−1. In this table, block addresses 311 of a snapshot and data allocation thereof are stored. In order to obtain the block addresses 311 of a snapshot and the data arrangement thereof, copy saving addresses 312 of the block copy management table 211 may be referenced.

For example, when the data of a snapshot having a block address of 0 is to be read, the table is referenced by the snapshot management program 106. At this time, the row denoted by 321 in the block copy management table 211 corresponds to the column of the block addresses 311 and a block address 0 of the snapshot. Therefore, when the copy saving address 312 of the row 321 is referenced, it can be confirmed that the data is present in a differential volume address 100. Meanwhile, the case where the block copy is not performed corresponds to the case where the block address 1 of the snapshot is referenced. The row 322 in the block copy management table 211 represents the block address 1 of the snapshot, and when the copy saving address 312 thereof is referenced, it turns out to be "NULL". That is, since data has not copied for the snapshot, the data can be read from the block address 1 in the operation volume. The same is true of the rows 323 and 324.

FIG. 4 is an explanatory diagram showing an example of the used block management table 212. In this embodiment, the differential volume consists of n blocks, and the table has n rows from a row 421 having a block address of 0 to a row 423 having a block address of n−1. In this table, the state of used blocks of the differential volume is stored. The differential volume manages differential data for a snapshot, and the used block management table 212 is required for performing consistent management such that data in different blocks in the operation volume are not stored in the same block in the differential volume.

The state of use of the block addresses 411 of the differential volume is represented by status flags 412. For example, the state of the block address 0 of the differential volume is represented when the row 421 having the block address 411 of 0 in the used block management table 212 is referenced. Since the status flag 412 of the row 421 is "used", it is confirmed that the block address 0 of a snapshot has already been used as a block for saving data for the snapshot. Meanwhile, a block address p in the row 422 is confirmed to be unused when the status flag 412 thereof is referenced. Therefore, it can be used as a destination for copying data from the operation volume for keeping the snapshot. The same is true of the row 423.

FIG. 5 to FIG. 8 show the details of the manner how each of the sub programs of the snapshot management program 106 operates. Hereinafter, each of them will be described.

Figure 5:
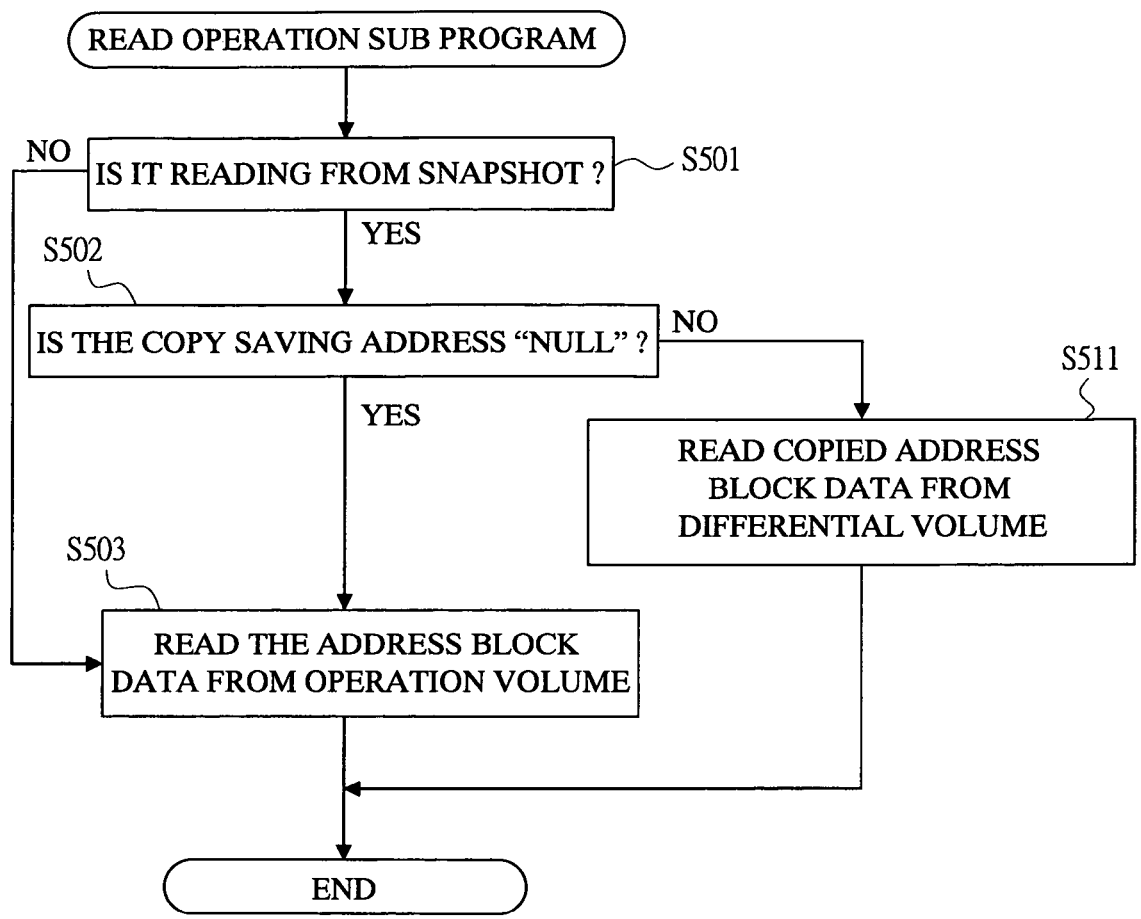
FIG. 5 is a flow diagram showing an operation example of a read operation sub program in the first embodiment of the present invention.

FIG. 5 is a flow diagram showing an operation example of the read operation sub program 201. This sub program is executed when the operation volume or the snapshot is read by the file system program 105.

First, the read operation sub program 201 checks whether it is read from a snapshot as the read target volume (S501). When it is not read from a snapshot (NO), data is read from the specified block in the operation volume (S503). When it is read from a snapshot (YES), the program references the block copy management table 211 and checks whether the value of the copy saving address of the block to be read is "NULL" (S502). When the value is "NULL" (YES), since the data has not been copied to the differential volume, the data is read from the specified block in the operation volume (S503) and the process is ended. When the value of the copy saving address is not "NULL" but is a numeric value (NO), since the data of the snapshot has been copied in the differential volume, the data is read from the block specified by the copy saving address in the differential volume (S511), and the process is ended.

Figure 6:
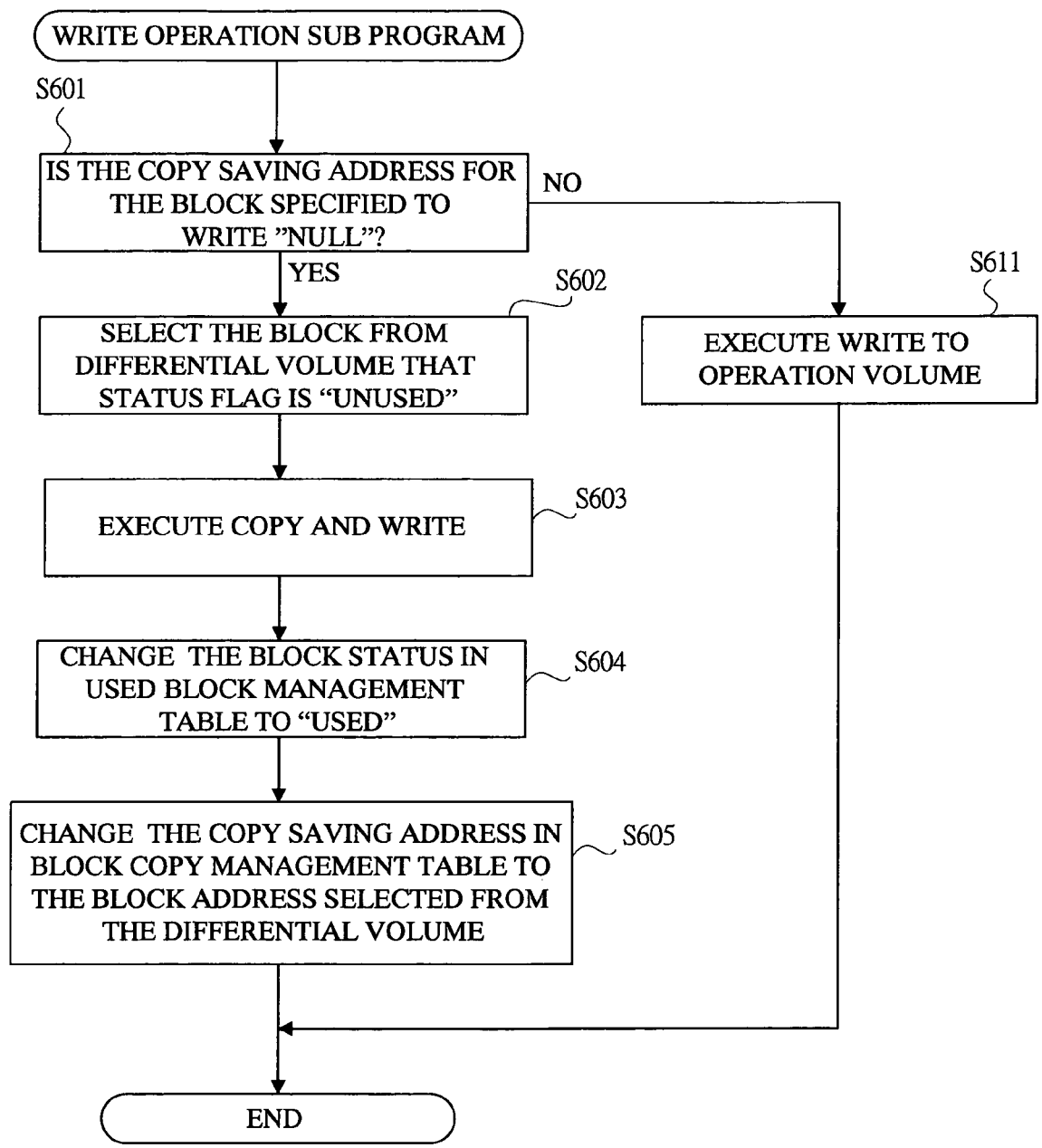
FIG. 6 is a flow diagram showing an operation example of a write operation sub program in the first embodiment of the present invention.

FIG. 6 is a flow diagram showing an operation example of the write operation sub program 202. This sub program is executed when data is written to the operation volume by the file system program 105.

First, the write operation sub program 202 checks whether the copy saving address for the block specified to write is "NULL" (S601) with reference to the row of the block which is specified for writing in the block copy management table 211. If it is not "NULL" (NO), write to the operation volume is executed (S611), and the process is ended. If it is "NULL" (YES), data has to be copied from the operation volume to the differential volume before performing the write. Therefore, first, the program references the used block management table 212 to select the block whose status flag is "unused" from the differential volume (S602). Then, copy and write operations are executed so that a data copy operation from the block of the operation volume to which the write operation is to be performed to the unused block of the differential volume and the write operation to the operation volume are performed at the same time (S603). Thereafter, the status flag of the block to which the copy operation has been executed in the used block management table is changed to "used" in order to associate it with the used state of the differential volume (S604). In order to keep the data consistency of the snapshot, the copy saving address in the block copy management table is changed to the block address selected from the differential volume (S605), and the process is ended.

Figure 7:
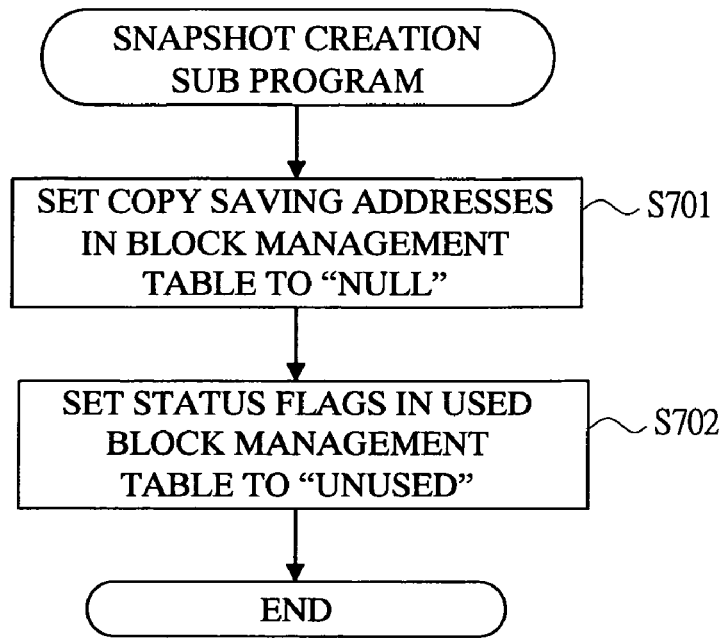
FIG. 7 is a flow diagram showing an operation example of a snapshot creation sub program in the first embodiment of the present invention.

FIG. 7 is a flow diagram showing an operation example of the snapshot creation sub program 203. This sub program is executed when operation of a snapshot is started, and it performs a process of initializing the block copy management table 211 and the used block management table 212 which is necessary for keeping the snapshot. First, the copy saving addresses in the block copy management table 211 are set to "NULL" (S701). Then, the status flags in the used block management table 212 are set to "unused" (S702). At this time, in the block copy management table 211, all rows from 0 to m−1 are subjected to the setting, and in the used block management table 212, all rows from 0 to n−1 are subjected to the setting.

Figure 8:
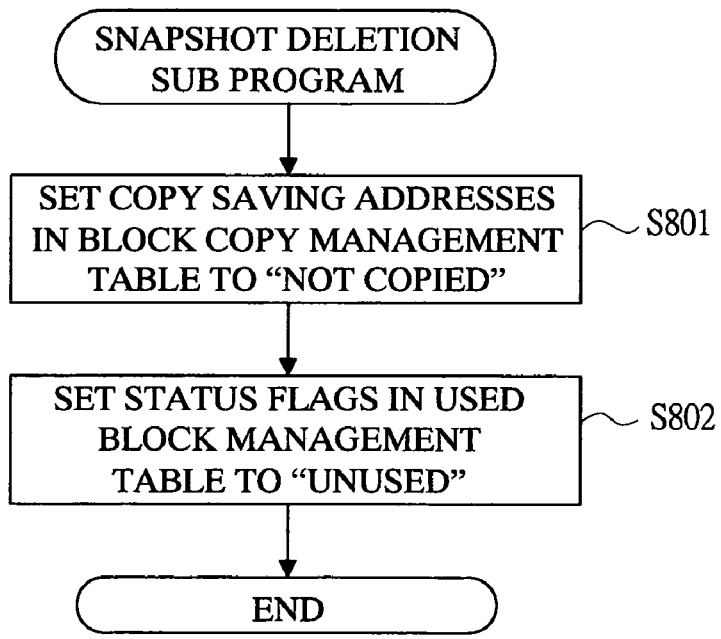
FIG. 8 is a flow diagram showing an operation example of a snapshot deletion sub program in the first embodiment of the present invention.

FIG. 8 is a flow diagram showing an operation example of the snapshot deletion sub program 204. This sub program is executed when operation of a snapshot is terminated, that is, a process of discarding the contents of the block copy management table 211 and the used block management table 212 is performed. First, the copy saving addresses in the block copy management table 211 are set to "not copied" (S801). Then, the status flags in the used block management table 212 are set to "unused" (S802). At this time, in the block copy management table 211, all rows from 0 to m−1 are subjected to the setting, and in the used block management table 212, all rows from 0 to n−1 are subjected to the setting.

As described above, the snapshot is kept by means of the software which operates in the server system 101. When read or write operations, or copy and write operations of data are executed in the processes of the software, an I/O command is issued to the storage subsystem 111. According to the command, the server system 101 accesses the data in the disk drive 117 and the disk drive 118.

Next, the I/O command processing program 115 which operates in the storage subsystem 111 will be described with reference to FIG. 9 to FIG. 13. A READ command is used for reading data from the server system 101, a WRITE command is for writing data from the server system 101, and a COPY and WRITE command is for executing copy and write operations from the server system 101. Also, other commands that can be executed in the storage subsystem 111 include a command for obtaining the connection states of devices and a command for obtaining the capacity information of the disk drives. However, descriptions of the commands that are not used for keeping a snapshot are omitted.

Figure 9:
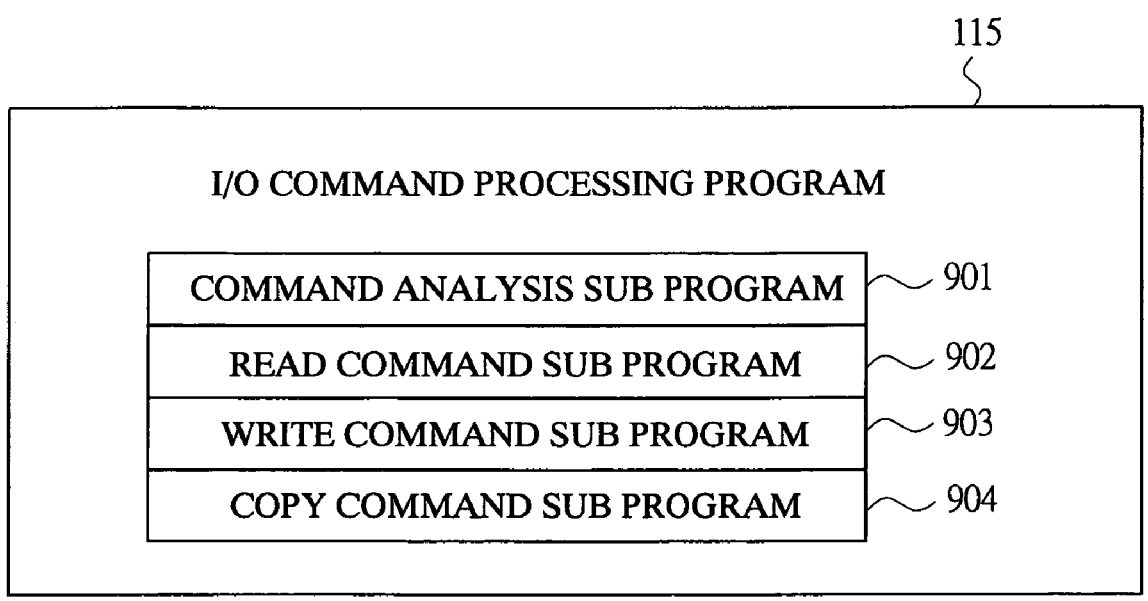
FIG. 9 is an explanatory diagram showing a configuration example of an I/O command processing program in the first embodiment of the present invention.

FIG. 9 is an explanatory diagram showing a configuration example of the I/O command processing program 115. The I/O command processing program 115 comprises sub programs for each command and a sub program for checking the type of the commands. A command analysis sub program 901 receives a command issued from the server system 101, and according to the contents thereof, performs a process of invoking a process sub program corresponding to the type of the command. A READ command sub program 902 performs a process of a READ command and performs data transfer from the disk drives to the server system 101. In addition, a WRITE command sub program 903 performs a process of a WRITE command and performs data transfer from the server system 101 to the disk drive. A COPY command sub program 904 performs a process of duplicating the data stored in a block in a disk drive to another block. The duplication destination block may be in the disk drive in which the duplication source block is stored or may be in the other disk drive.

FIG. 10 to FIG. 13 show the detailed operations of the sub programs constituting the I/O command processing program 115, which will be described sequentially.

Figure 10:
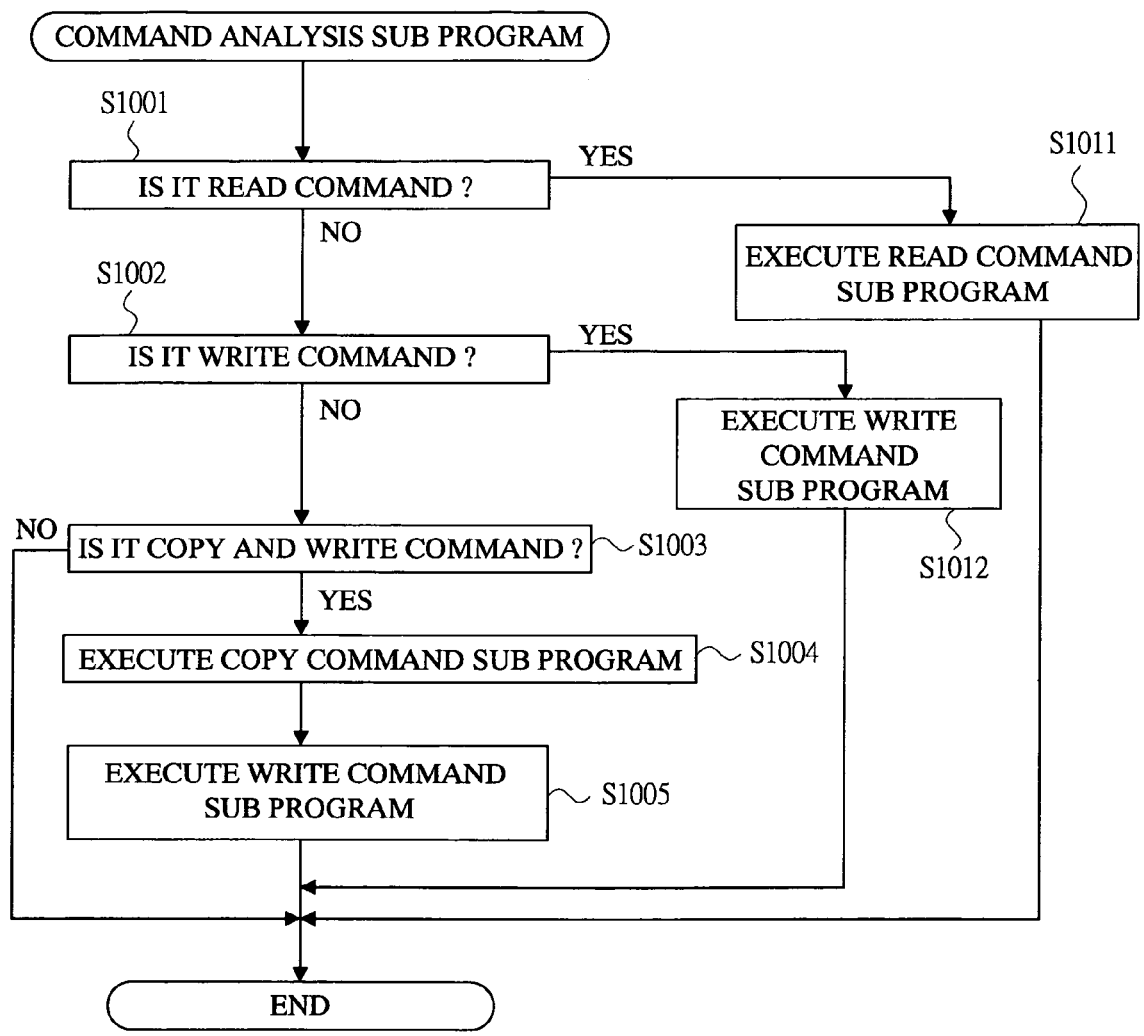
FIG. 10 is a flow diagram showing an operation example of a command analysis sub program in the first embodiment of the present invention.

FIG. 10 is a flow diagram showing an operation example of the command analysis sub program 901. An I/O command given from the server system 101 and received via the interface 104 and the interface 114 is first given to the command analysis sub program 901. Then, the type of the command is checked, and the sub program corresponding to the command is invoked.

First, the command is checked whether it is a READ command (S1001), and if it is a READ command (YES), the READ command sub program is executed (S1011). If it is not a READ command (NO), the command is checked whether it is a WRITE command (S1002), and if it is a WRITE command (YES), the WRITE command sub program is executed (S1012). If it is not a WRITE command (NO), the command is checked whether it is a COPY and WRITE command (S1003), and if it is a COPY and WRITE command (YES), the COPY command sub program is first executed (S1004)

and then the WRITE command sub program is executed (S1005). If it is not a COPY and WRITE command(NO), nothing is done.

As described above, the command analysis sub program 901 executes a sub program corresponding to each command to process the I/O command. Also, in the processing of a COPY and WRITE command, by keeping an order in which a COPY command is executed first and then a WRITE command is executed, consistency of the snapshot can be maintained.

Figure 11:
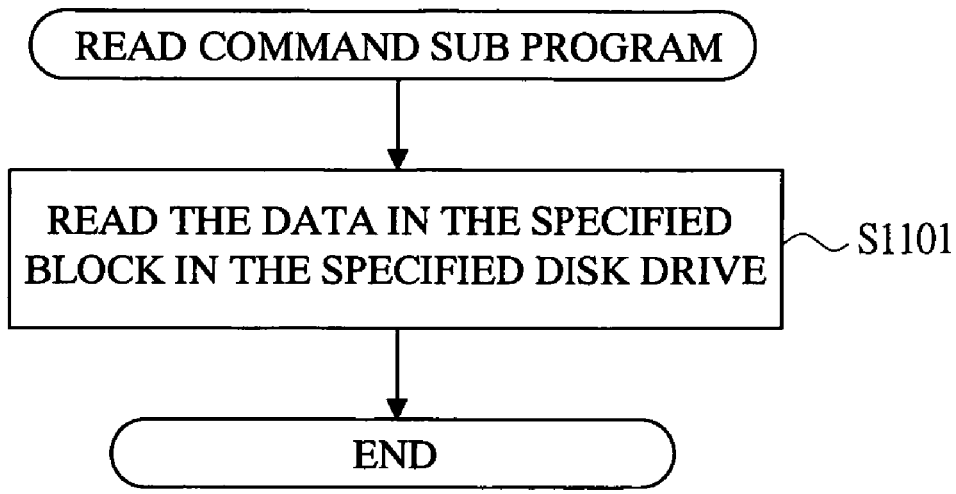
FIG. 11 is a flow diagram showing an operation example of a READ command sub program in the first embodiment of the present invention.

FIG. 11 is a flow diagram showing an operation example of the READ command sub program 902. When the READ command sub program 902 is invoked by the command analysis sub program 901, it reads the specified data in the specified block in the disk drive specified by the contents of the command (S1101). The information for identifying the disk drive, the block address in the disk drive, the quantity of the data to be read, and the address of the memory 103 of the server system 101 which is the destination of data transfer have to be specified in the command.

Figure 12:
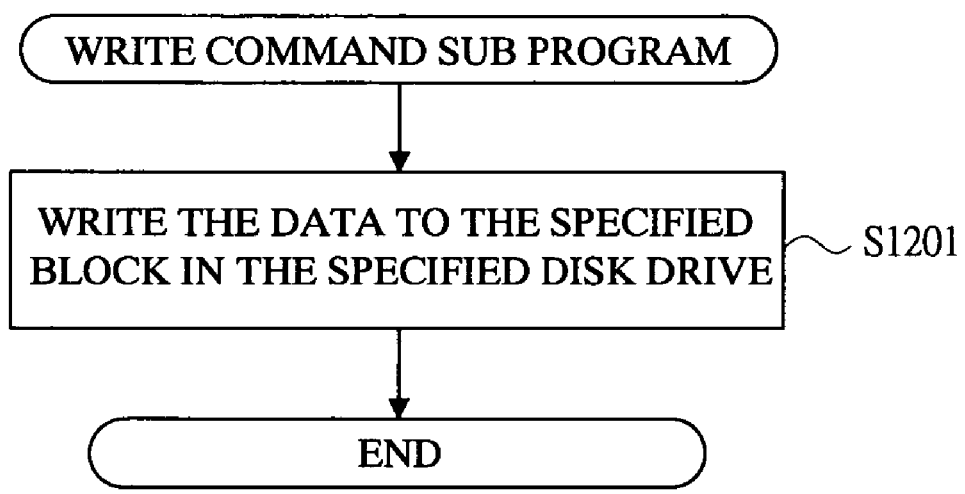
FIG. 12 is a flow diagram showing an operation example of a WRITE command sub program in the first embodiment of the present invention.

FIG. 12 is a flow diagram showing an operation example of the WRITE command sub program 903. When the WRITE command sub program 903 is invoked by the command analysis sub program 901, the specified data is written to the block in the disk drive which is specified by the contents of the command (S1201). Therefore, the information for identifying the disk drive, the block address in the disk drive, the quantity of data to be written, and the address of the memory 103 of the server system 101 for specifying the data to be written have to be specified in the command.

Figure 13:
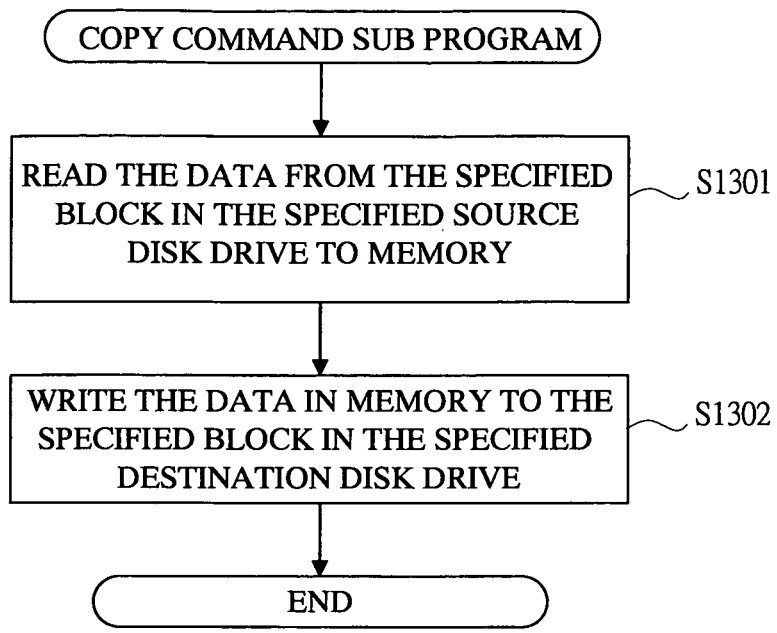
FIG. 13 is a flow diagram showing an operation example of a COPY command sub program in the first embodiment of the present invention.

FIG. 13 is a flow diagram showing an operation example of the COPY command sub program 904. According to the contents of a command, the data is read from the specified block in the specified source disk drive to the memory (S1301). Then, the read data in the memory is written to the specified block in the specified destination disk drive (S1302), thereby copying the data. Therefore, the information for identifying the disk drive, that is, the block address in the disk drive has to be specified in the command for each of the copy source and the copy destination. In addition, the quantity of the data to be copied has to be specified. A method in which data is temporarily stored in the memory for copying the data has been described, however, if data copy can be executed by means of cooperation between the disk drives, the method using this function is also available.

Figure 14:
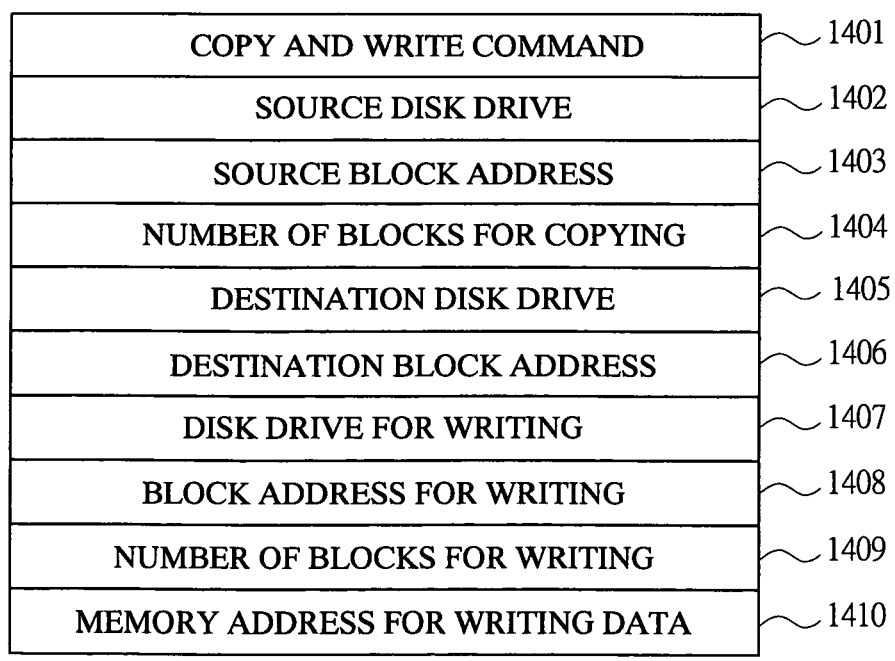
FIG. 14 is an explanatory diagram showing a format example of a COPY and WRITE command in the first embodiment of the present invention.

FIG. 14 is an explanatory diagram showing a format example of a COPY and WRITE command at the time when the COPY and WRITE command is issued from the server system 101 to the storage subsystem 111. The information to be instructed in the command needs the identifier of the COPY and WRITE command 1401 which is the information for distinguishing the command. In addition, in order to perform the data copy operation, the identifier representing a source disk drive 1402, a source block address 1403 representing the data arrangement, and the number of blocks for copying 1404 for representing the quantity of data to be copied are included. In addition, as the information for specifying the copy destination, a destination disk drive 1405 and the destination block address 1406 are specified. Also, as the information for performing a write operation, a disk drive for writing 1407, a block address for writing 1408, the number of blocks for writing 1409, and the data to be written are retained in the server system 101. Therefore, a memory address for writing data 1410 is specified. When a command specifying the above-described data is issued, the COPY and WRITE command is executed.

In the example shown in FIG. 14, the quantity of data to be copied and the quantity of data to be written are both specified in the COPY and WRITE command. However, when the same data quantity is copied and written, it is necessary to specify only either of them. When copy and write operations are permitted only in units of block, the command format not specifying the data quantity is also available.

Also, the format of the COPY and WRITE command can be easily extended to a format in which plural data copies are specified together in one command, a format in which plural writes are specified together in one command, or a format in which above-described formats are combined. In these cases, the effect for reducing data transfer between the server system 101 and the storage subsystem 111 is further enhanced.

In the example shown in FIG. 14, the COPY and WRITE command is one continuous command. However, a method in which a plurality of areas are employed as a command is also available. For example, in the case where SCSI interfaces are employed, a method in which a command and the information required as a parameter list in relation to the command are specified is available.

As described above, by the use of the COPY and WRITE command, a snapshot can be kept by utilizing the interfaces for giving instructions from the server system to the storage subsystem. Since the data transfer between the server system and the storage subsystem can be reduced, degradation of data access performance with respect to the operation volume can be reduced. In addition, the interfaces for managing the differential volume not from the storage subsystem but from the server system are provided.

Second Embodiment

This embodiment shows an example in which the server system issues a command for swapping block arrangement in the disk drives in the storage subsystem (referred to as a SWAP command here), and the storage subsystem executes the command, thereby keeping a snapshot.

This embodiment is based on the premise that the blocks of the disk drives in the storage subsystem are logically configured in the storage subsystem. More specifically, regardless of physical data arrangement in the disk drives, the server system can access the disk drives logically as one disk drive.

A storage system of this embodiment has the same configuration as that of the first embodiment. However, the process flow of the write operation sub program 202 of the snapshot management program 106 shown in FIG. 2 is different. Also, the configuration of the I/O command processing program 115 is different. Hereinafter, the processes different from the first embodiment will be described.

Figure 15:
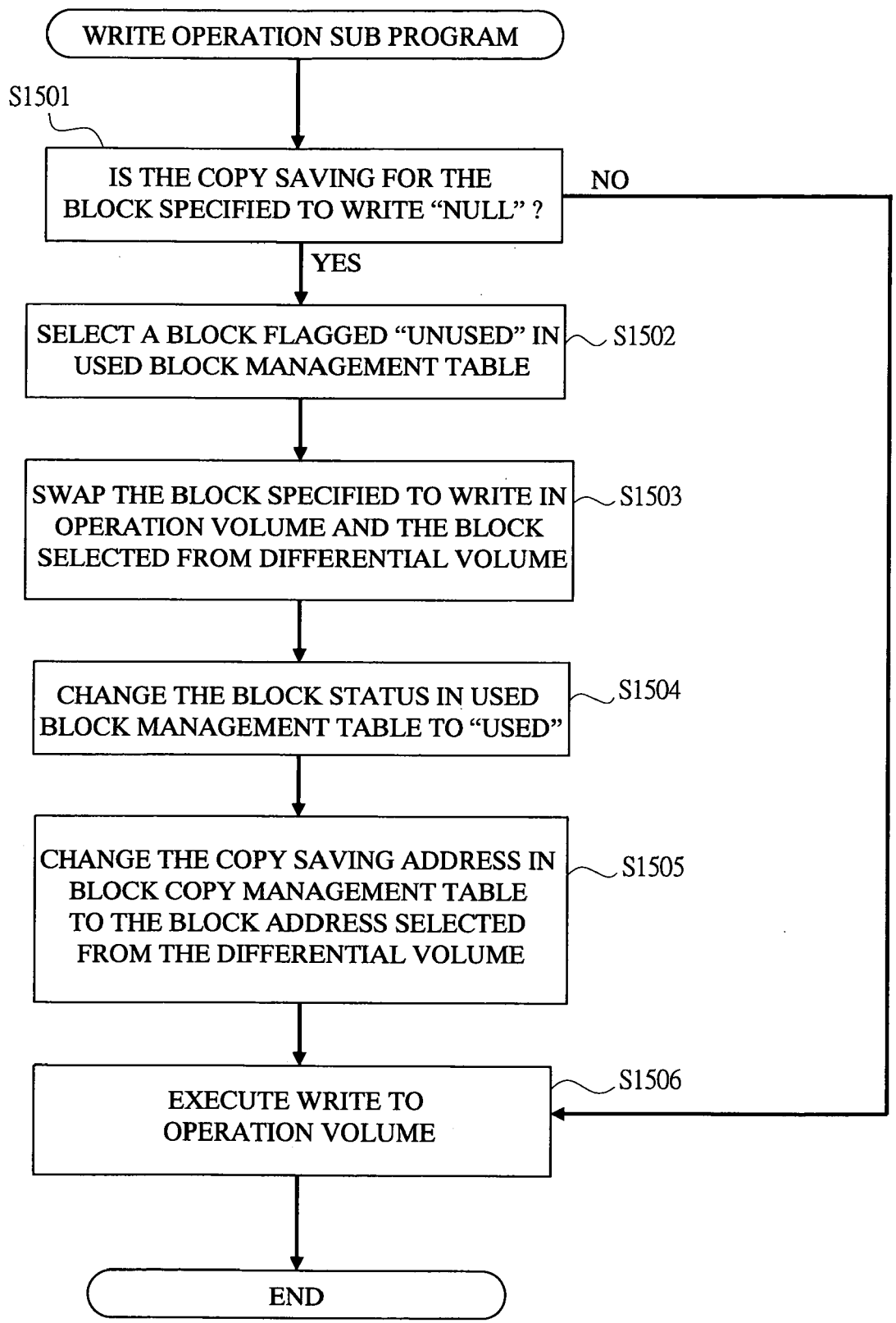
FIG. 15 is a flow diagram showing an operation example of a write operation sub program in a second embodiment of the present invention.

FIG. 15 is a flow diagram showing an operation example of the write operation sub program 202 of the snapshot management program 106. This embodiment is different from the first embodiment in the point that a data copy operation is not performed in the storage subsystem 111, and a swap operation is executed between the block specified to write in the operation volume and the unused block selected from the differential volume (S1503). Also, in the first embodiment, load on the server system 101 is reduced by executing copy and write operations at the same time. However, in this embodiment, swap operations of blocks and write operations are executed as different commands. Other processes (S1501, S1502, and S1504 to S1506) are the same as those in the first embodiment.

In addition, swap operations of blocks and data write operations can be executed at the same time by one command similarly to the first embodiment in which copy and write operations are executed at the same time. In both methods, the same effect as that obtained by copying the data in the operation volume to the differential volume can be realized by swapping blocks. Therefore, in the same manner as the first embodiment, a snapshot can be formed by the use of the block copy management table 211 and the used block management table 212.

FIG. 16 to FIG. 19 are diagrams explaining the configuration and processes of the I/O command processing program 115 which operates in the storage subsystem 111, and the data required for the processes. The operation of the storage subsystem 111 will be described with reference to these diagrams.

Figures 16, 17:
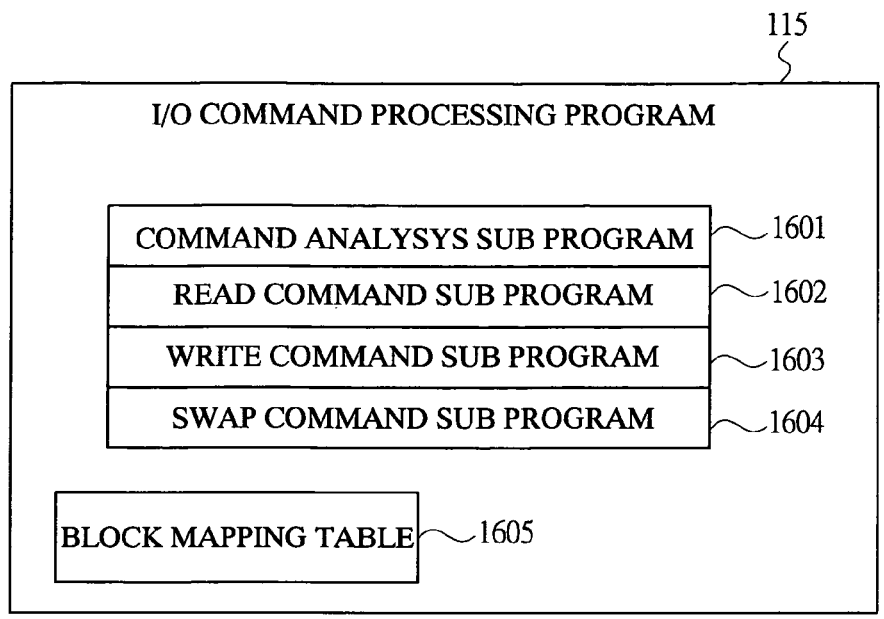
FIG. 16 is an explanatory diagram showing a configuration example of an I/O command processing program in the second embodiment of the present invention.
FIG. 17 is an explanatory diagram showing an example of a block mapping table in the second embodiment of the present invention.

FIG. 16 is an explanatory diagram showing a configuration example of the I/O command processing program 115. The example is different from the first embodiment in the point that a SWAP command sub program 1604 and the block mapping table 1605 are provided instead of the COPY command sub program. The SWAP command sub program 1604 processes a SWAP command requested from the server system 101. The block mapping table 1605 is a table for managing the disk drive, which is referenced by the server system 101, as a logical disk drive to retain the corresponding relation with the data of the physical disk drive. Other configurations (1601 to 1603) are the same as those in the first embodiment.

FIG. 17 is an explanatory diagram showing an example of the block mapping table 1605. FIG. 17 shows the block mapping table 1605 of the operation volume, and the same table has to be prepared also for the differential volume. The block mapping table 1605 is composed of a column representing logical block addresses 1701, a column representing physical disk numbers 1702 in which the data of the logical block address is present, and a column representing physical block addresses 1703 representing the locations of the data in the physical disks.

First, the block mapping table 1605 is initialized in a state where the data arrangement of the physical disk drive is represented without modification. The example in FIG. 17 shows the case where a logical disk drive having m blocks is initialized by using the areas from the block address 0 to the block address m−1 in a disk drive having a physical disk number 0. However, as a result of execution of a SWAP command, the data at the logical block address q has been swapped with the data at the block address 100 of the disk drive having a physical disk number 1. At this time, in the block mapping table of the differential volume, the data at the logical block address 100 represents the data at the block address q in the physical disk number 0. As described above, corresponding relation of data between the logical disk drive and the physical disk drive are managed so as to assist the operation of the snapshot management program of the server system 101.

Figure 18:
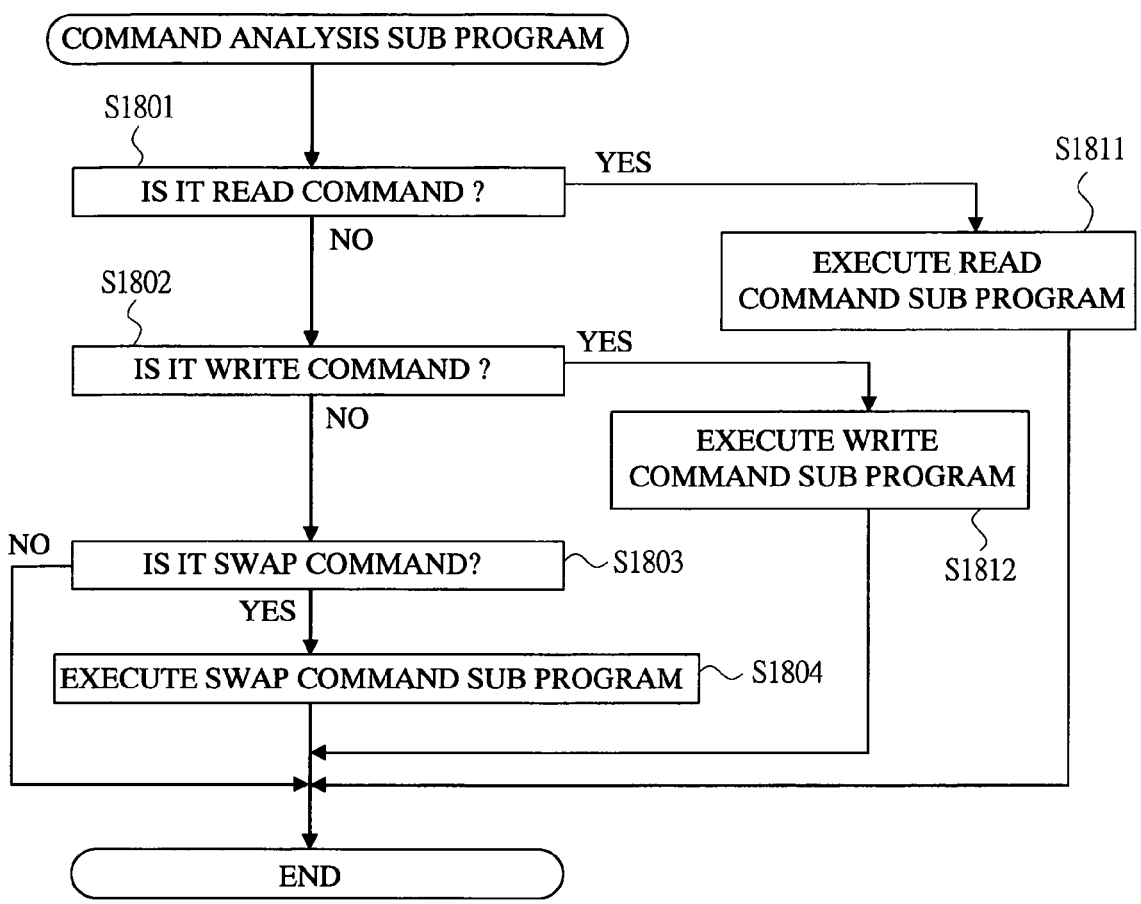
FIG. 18 is a flow diagram showing an operation example of a command analysis sub program in the second embodiment of the present invention.

FIG. 18 is a flow diagram showing an operation example of the command analysis sub program 1601. The operation is different from that of the first embodiment in the point that the process of executing the COPY and WRITE command is omitted and control to perform a process of a SWAP command is included. More specifically, the process of checking whether the command is a SWAP command (S1803) is performed, and if it is a SWAP command (YES), the SWAP command sub program (S1804) is executed. Other processes (S1801, S1802, S1811, and S1812) are the same as those in the command analysis sub program of the first embodiment.

The processes of the READ operation sub program 1602 and the WRITE operation sub program 1603 are the same as those in the first embodiment. However, since the block mapping table 1605 for configuring the logical disk drive is employed in this embodiment, the processes should be performed after converting the required disk drive and block address into a physical disk number and a physical block address.

Figure 19:
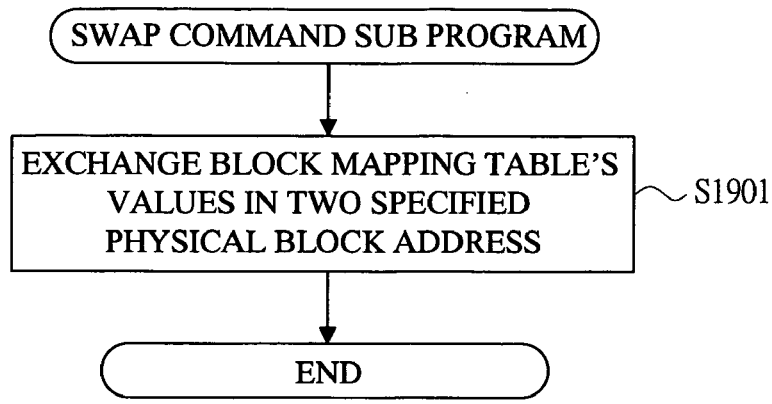
FIG. 19 is a flow diagram showing an operation example of a SWAP command sub program in the second embodiment of the present invention.

FIG. 19 is a flow diagram showing an operation example of the SWAP command sub program 1604. The SWAP command sub program performs a process of converting the data arrangement in the logical disk drive by controlling the values of the block mapping table. The process of the command is ended when exchanging the block mapping table's values in two specified physical block addresses in the disk drives (S1901). Therefore, two pairs of targets to be exchanged, that is, the disk drives and the block addresses are specified in the command. In addition, it is also possible to specify the number of blocks to be exchanged in order to exchange a plurality of successive blocks.

Figure 20:
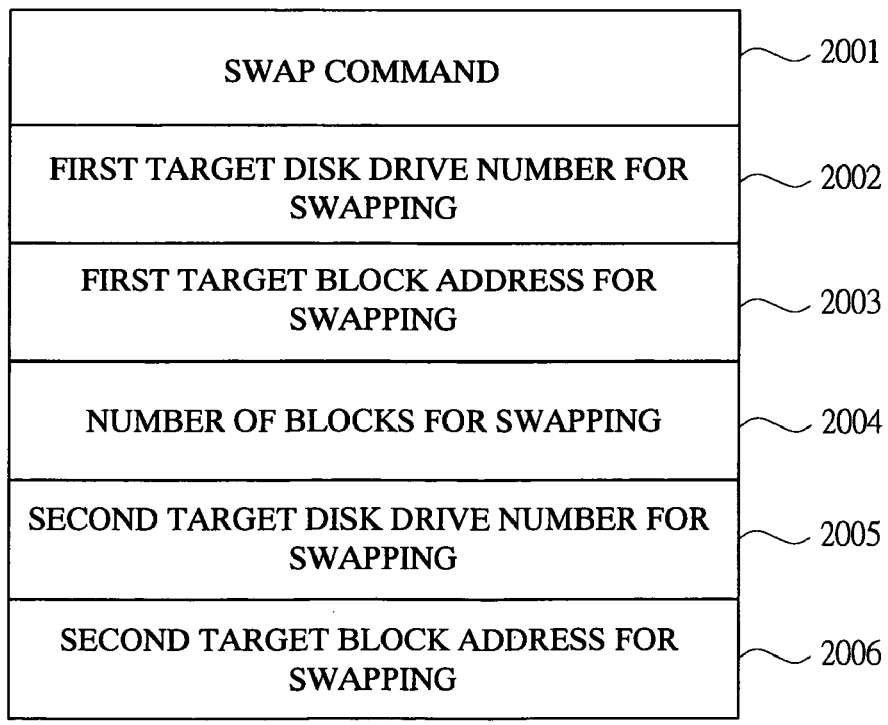
FIG. 20 is an explanatory diagram showing a format example of a SWAP command in the second embodiment of the present invention.

FIG. 20 is an explanatory diagram showing a format example of the SWAP command. In the command, the identifier representing a SWAP command 2001 for distinguishing the command from other commands, a first target disk drive number for swapping (2002) and a first target block address for swapping (2003) which are targets to be exchanged, and the number of blocks for swapping (2004) are specified. In addition, as the other one of the two pairs, a second target disk drive number for swapping (2005) and a second target block address for swapping (2006) which are the targets to be exchanged are specified. In this embodiment, the target disk drive number for swapping represents an identifier for distinguishing a logical disk drive, and the target block address for swapping represents the block address of the logical disk drive. Also, when executing the command, it is possible to change the mapping by swapping the values in the block mapping table, which is retained in the storage subsystem 111.

Furthermore, in the case of the command format in which the data swapping is performed, not only a format in which one pair of data swapping is specified but also a format in which a plurality of data swapping are described at the same time may be employed. In addition, similar to the COPY and WRITE command, it is possible to extend the format so as to describe the data write by the same command format. In these cases, since data transfer between the server system 101 and the storage subsystem 111 is reduced more than the case using the SWAP command, the effects of the present invention is further enhanced.

As described above, since the storage subsystem which processes a SWAP command and the snapshot management program in the server system 101 execute the SWAP command so as to perform the processes for keeping a snapshot, it is possible to keep the snapshot. In addition, by reducing data transfer between the server system 101 and the storage subsystem 111, degradation of the data access performance to the operation volume can be reduced.

When the SWAP command is employed, since data arrangement of a logical disk drive is distributed to the plurality of physical disk drives, there is the possibility that data access performance is degraded. For example, it is assumed that the disk blocks having one block address of the logical disk drive are alternately distributed to two physical disk drives. In this case, when read of successive data is performed from the server system, the data of each one block address has to be transferred from different physical disk drives. Accordingly, data seek or the like in the disk drives requires more time, and therefore, the read performance thereof is degraded. Similarly, the write performance is also degraded.

In order to minimize the performance degradation, it is preferable that the swapped disk blocks are periodically written back to the source block addresses in the same physical disk drive. That is, not only the process of swapping the block mapping data but also the process of swapping the data thereof are performed. As a result, a data sequence is ordered and therefore, the performance degradation can be reduced.

Figure 21:
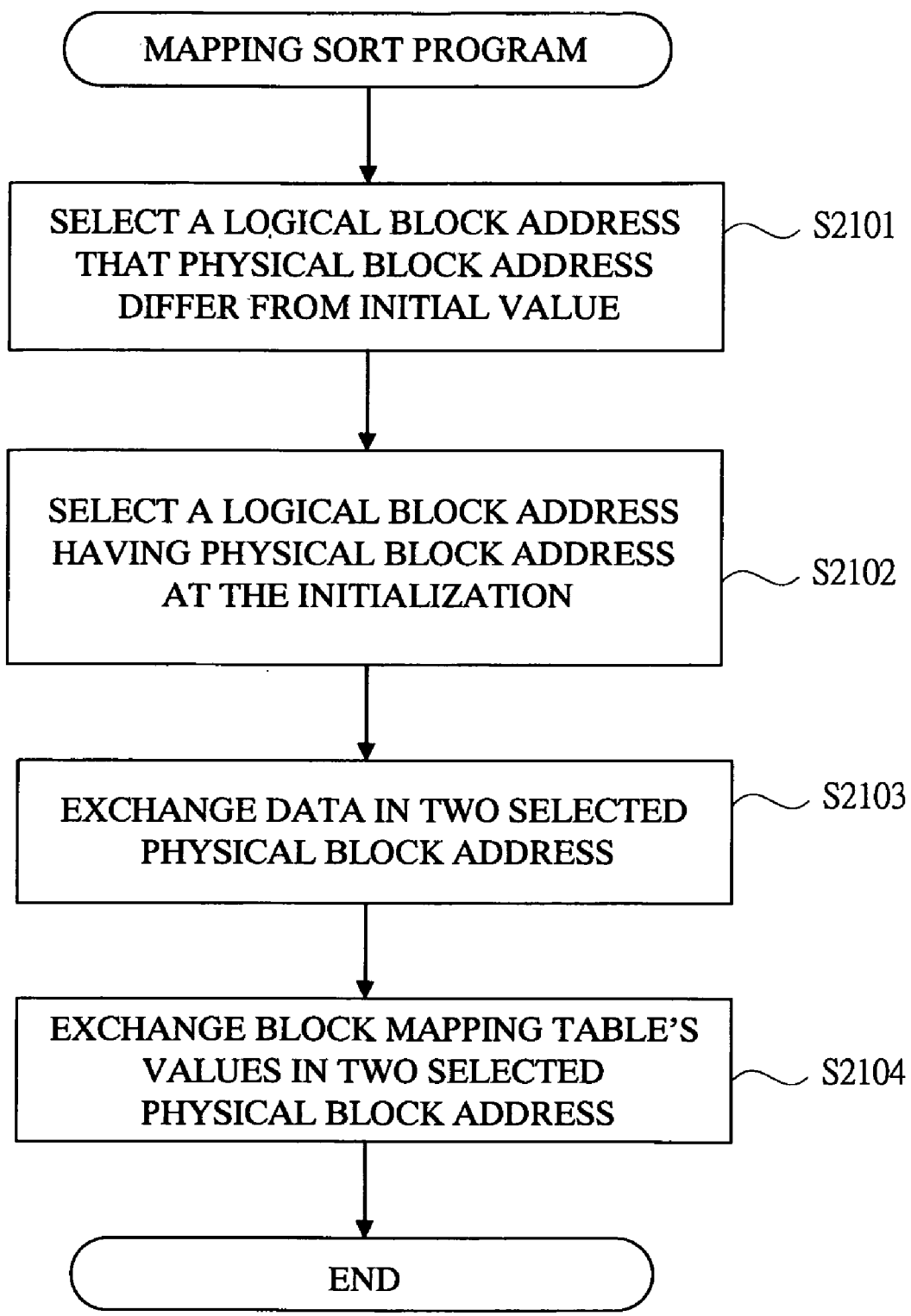
FIG. 21 is a flow diagram showing an operation example of a mapping sort program in the second embodiment of the present invention.

FIG. 21 is a flow diagram showing an operation example of a mapping sort program for sorting the mapping table in order to reduce the performance degradation. When the program is executed in the storage subsystem 111, data arrangement is changed to the above-described desirable state. The program can be started by various methods, for example, a method in which the server system 101 gives an instruction to the storage subsystem 111 for starting, a method in which the program is executed periodically in the storage subsystem 111, or a method in which the program is started when processing load on the storage subsystem 111 is small.

The mapping sort program selects a logical block address having a physical block address different from the initial value in the mapping table (S2101) with reference to the mapping table of the logical volume which is the target of sorting. This step can be executed by storing the physical disk numbers at the time of initialization as the information associated with the mapping table in advance and comparing the address with it. Then, the program selects the logical block address having the initial physical block address which has been retained by the logical block address selected in S2101 at the time of initialization (S2102). This step can be executed by sequentially searching the block mapping tables retained in the storage subsystem 111. Then, data in the two blocks selected in S2101 and S2102 are exchanged (S2103). As a result, the one block of data in the logical disk drive selected in S2101 is sorted and disposed. This data swap can be executed by temporarily reading the data from each of the blocks to a memory and writing the data to the other block. Finally, a data sort operation in the logical disk drive is ended by exchanging the block mapping table's values in the two selected physical block addresses (S2104).

By repeatedly executing the mapping sort program to the logical disk drive of the operation volume, data arrangement in the physical disk drives can be sorted.

In the foregoing, the invention made by the inventor of the present invention has been described based on specific embodiments. However, it is needless to say that the present invention is not limited to the foregoing embodiments, and various modifications and alterations can be made within the scope of the present invention.

For example, the COPY and WRITE command and the SWAP command according to the present invention can be used in defragmentation, which is a process of eliminating a fragmented state in which data in file systems or volumes are not continuous and scattered. Also, the SWAP command can be widely applied since the SWAP command can swap data arrangement in volumes at high speed. The information stored in disk drives of a storage subsystem and the information stored in another storage subsystem connected to outside can be swapped by means of the SWAP command. Therefore, the SWAP command can be applied for enabling appropriate arrangement of information and optimization of data access performance by, for example, saving the data, which is not frequently referenced, to outside and gathering frequently referenced information in a high-speed storage subsystem.

What is claimed is:

1. A storage subsystem, comprising:
a plurality of storage devices including first and second storage devices; a connection device for connecting said storage subsystem with an external device; and a control unit,
wherein said plurality of storage devices have a function to store data which has been received from an external device via said connection device,
wherein said external device is capable of issuing a first command for the storage subsystem to perform a data copy process from the first storage device to the second storage device and a data storage process to said first storage device and is also capable of issuing a second command to perform the data storage process to the first storage device without performing the data copy operation,
said control unit has a function to process a command for accessing the data which has been received via said connection device and stored in said plurality of storage devices, and
said command processed by said control unit includes the first command and the second command such that the data copy process and the second command such that the data copy process and the data storage process can be performed independently of one another.

2. The storage subsystem according to claim 1, wherein said control unit has a function to execute, after receiving said first command, a data copy process from said first storage device to said second storage device and subsequently a data storage process to said first storage device.

3. A storage subsystem according to claim 1, wherein said external device is a server and said first command is a copy and write command.

4. A storage subsystem according to claim 3, wherein said external device is configured to determine whether to issue the first command or the second command in accordance with a determination as to a state of the first storage device.

5. A storage subsystem according to claim 4, wherein said first storage device is an operation volume and said second storage device is a differential volume configured to store different data between a snapshot and the operation volume.

6. A storage subsystem according to claim 3, wherein said first storage device is an operation volume and said second storage device is a differential volume configured to store different data between a snapshot and the operation volume.

7. A storage subsystem according to claim 1, wherein said external device is configured to determine whether to issue the first command or the second command in accordance with a determination as to a state of the first storage device.

8. A storage subsystem according to claim 7, wherein said first storage device is an operation volume and said second storage device is a differential volume configured to store different data between a snapshot and the operation volume.

9. A storage subsystem according to claim 1, wherein said first storage device is an operation volume and said second storage device is a differential volume configured to store different data between a snapshot and the operation volume.

10. A storage system, comprising:
a storage subsystem including a plurality of storage devices including first and second storage devices, a connection device for connecting the storage subsystem with an external device, and a control unit; and
a server system serving as said external device connected to said storage subsystem,
wherein said plurality of storage devices of said storage subsystem have a function to store data which has been received from said server system via said connection device,
wherein said server is capable of issuing a first command for the storage subsystem to perform a data copy process from the first storage device to the second storage device and a data storage process to said first storage device and is also capable of issuing a second command to perform the data storage process to the first storage device without performing the data copy operation, said control unit of said storage subsystem has a function to process a command for accessing the data which has been received via said connection device and stored in said plurality of storage devices, said command processed by said control unit of said storage subsystem includes the first command, and the second command such that the data copy process and the data storage process can be performed independently of one another, and said control unit of said storage subsystem has a function to execute, after receiving said first command, a data copy process from said first storage device to said second storage device and subsequently a data storage process to said first storage device.

11. A storage system according to claim 10, wherein said first command is a copy and write command.

12. A storage system according to claim 10, wherein said server is configured to determine whether to issue said first command or said second command in accordance with a determination as to a state of the first storage device.

13. A storage system according to claim 10, wherein said first storage device is a write target operation volume and said second storage device is a differential volume configured to store a differential between a snapshot and the write target operation volume and wherein said server is capable of checking whether or not a copy saving address of a block of the write target operation volume is "NULL", and when it is "NULL", issuing the first command for executing the copy to the differential volume and the writing to the operation volume, and when it is not "NULL", issuing the second command for executing the writing to the write target operation volume without the copy operation.

14. A method for keeping a snapshot in a storage system, said storage system, comprising:

a storage subsystem including a plurality of storage devices including first and second storage devices, a connection device for connecting the storage subsystem with an external device, and a control unit; and a server system serving as said external device connected to said storage subsystem, wherein, when write is to be performed on the data operated in a first storage device and a first condition exists, said server system issues a first command, which specifies a write target address and performs a copy process from said first storage device to a second storage device and a data storage process to said first storage device in accordance with a predetermined sequence, to said storage subsystem, after receiving said first command, said control unit of said storage subsystem executes a process of copying the data at said write target address in said first storage device to said second storage device and subsequently storing the write data at said write target address of said first storage device, thereby storing the differential between said data operated in said first storage device and the data at the time of creation of a snapshot to said second storage device to keep the snapshot of said data operated in said first storage device, and wherein, when writing is being performed on the data operated in said first storage device and a second condition exists, said server issues a second command which specifies said write target at the write target address of the first storage device without specifying performing of a copy process, and after receiving said second command, said control unit of said storage subsystem stores the write data at the write target address of the first storage device without performing a copy process before writing the write data to the first storage device such that the data copy process and the data storage process can be performed independently of one another.

15. A method according to claim 14, wherein said first condition exists when said server determines that a copy saving address of a block of a write target operation volume is "NULL" and said second condition exists when said server determines that the copy saving address of a block of a write target operation volume is not "NULL."

* * * * *